(12) United States Patent
Melvin

(10) Patent No.: US 9,066,629 B1
(45) Date of Patent: Jun. 30, 2015

(54) NUMERICALLY CONTROLLED ESPRESSO GRINDER

(71) Applicant: Robert Melvin, Portland, OR (US)

(72) Inventor: Robert Melvin, Portland, OR (US)

( * ) Notice: Subject to any disclaimer, the term of this patent is extended or adjusted under 35 U.S.C. 154(b) by 294 days.

(21) Appl. No.: 13/838,307

(22) Filed: Mar. 15, 2013

(51) Int. Cl.
*A47J 42/44* (2006.01)
*A47J 42/06* (2006.01)
*B02C 25/00* (2006.01)

(52) U.S. Cl.
CPC *A47J 42/44* (2013.01); *A47J 42/06* (2013.01); *B02C 25/00* (2013.01)

(58) Field of Classification Search
CPC ........... A47J 31/42; A47J 42/56; A47J 42/52; A47J 42/44; B02C 25/00
USPC ............................................. 241/100, 30, 36
See application file for complete search history.

(56) References Cited

U.S. PATENT DOCUMENTS 5,201,474 A * 4/1993 Midden ......................... 241/100

* cited by examiner

*Primary Examiner* — Mark Rosenbaum
(74) *Attorney, Agent, or Firm* — Stephen W. Melvin

(57) ABSTRACT

A coffee grinder using a stepper or servo motor in which the amount of ground coffee output is correlated to degrees or increments of burr rotation. By controlling burr rotation a precise amount of coffee is delivered eliminating excess coffee from being ground.

14 Claims, 5 Drawing Sheets

NUMERICALLY CONTROLLED ESPRESSO GRINDER

FIELD OF THE INVENTION

This invention relates to the field of industrial design, and more specifically to methods and apparatus for grinding coffee beans for use in preparing beverages.

BACKGROUND

Coffee is used worldwide and many types of coffee consumption are practiced where it is desirable to freshly grind the coffee to be used in order to improve the quality of the drink being consumed. Good examples include the preparation of espresso and espresso based drinks. Typically, to grind coffee, grinding burrs are used in pairs or sets and operate with one burr fixed from rotation and the other burr driven to rotate. The adjacent spacing of the burrs along the axis of rotation is adjusted to change the coarseness of the grinding action and yield the desired result. This applies to both conical and flat type burr sets.

Variables which can change the quality and rate of ground coffee output include the grind coarseness setting, physical properties of the coffee beans being ground, environmental conditions such as humidity, and the physical condition of the burrs.

In many coffee grinding applications, with espresso shops being a good example, the coffee may be ground for fresh use in single extraction amounts. Grinders in this use may cycle on and off with great frequency, grinding for only a few seconds in duration at a time. The desired output may commonly have a specific target amount in the range of only 12 to 24 grams of ground coffee per cycle.

The accuracy and reliability with which a grinder generates a desired quantity of ground coffee is important. A primary means of compensating for inaccuracy and lack of reliability is to grind an excess of coffee for each dose and discard what is not needed. The discard of excess coffee, dose by dose can increase the consumption of inputs and the ratio of expense to product. In the short duration, repetitive grinding process used in much espresso service, many variables are emphasized. These include the time and output resulting from motor spin up and wind down, the dislodging or retention of small quantities of ground coffee within the grinder.

One of the strategies for grinding to a target dose is to use a programmable timer to control the grinder motor. However, due to dose to dose variations in starting torque needed, spin up and spin down, and the irregular delivery of ground coffee from within the grinder, the timer-base approach has significant limitations and consequently the discard of excess coffee can remain significant. Thus, improved systems and methods for coffee grinding are needed.

SUMMARY

A coffee grinder uses a stepper or servo motor in which the amount of ground coffee output is correlated to degrees or increments of burr rotation. By controlling burr rotation a precise amount of coffee is delivered eliminating excess coffee from being ground.

DETAILED DESCRIPTION

The present invention provides solutions to accurately grind to a target output quantity. In embodiments of the present invention, the amount of ground coffee output is correlated to degrees or increments of burr rotation. This allows the operation of an espresso grinder in terms of degrees or increments of burr rotation to deliver a desired quantity of ground coffee.

Motors and controls are used as necessary to control burr rotation in terms of degrees or increments by use of open or closed-loop means. Alternatively, the open or closed-loop enforcement of degrees or increments of rotation per unit time allows can allow the grinder to be controlled in terms of units of time per unit output.

For a use example, if the grinder according to an embodiment of the invention is being set to deliver 18 grams of ground coffee, the following steps could be used. If the coffee has been exchanged for service or cleaning has been performed, a small amount of coffee is ground to load the burrs. This amount can have an adjustable preset. The grind adjustment is set to a typical position. A sample amount based on known units of burr rotation is ground and weighed or measured. This sample amount can have an adjustable preset. The quantity of ground coffee in the sample produced is measured directly by the grinder or manually measured and entered. A calculation is performed to determine the ratio of units of rotation during the sample grind to quantity of output. The grinder can then automatically sets itself to rotate the burrs the calculated amount to deliver the desired amount of 18 grams output Alternatively, manual calculation and setting can be used to direct the grinder to produce the desired output. For any adjustments of the grinding coarseness, this process can be used. If the grinder is being used to produce a desired set output and an adjustment is made or a change in output is observed or needed, the measurement process can be used with the set amount to recalibrate the grinder. Because the grinder output is based on increments of rotation, the rate of rotation and the time used to produce a set amount of ground coffee can vary to allow features such as ramping of RPM, variable speed and rate, and other potential features such as reverse and vibrate.

Figure 1:
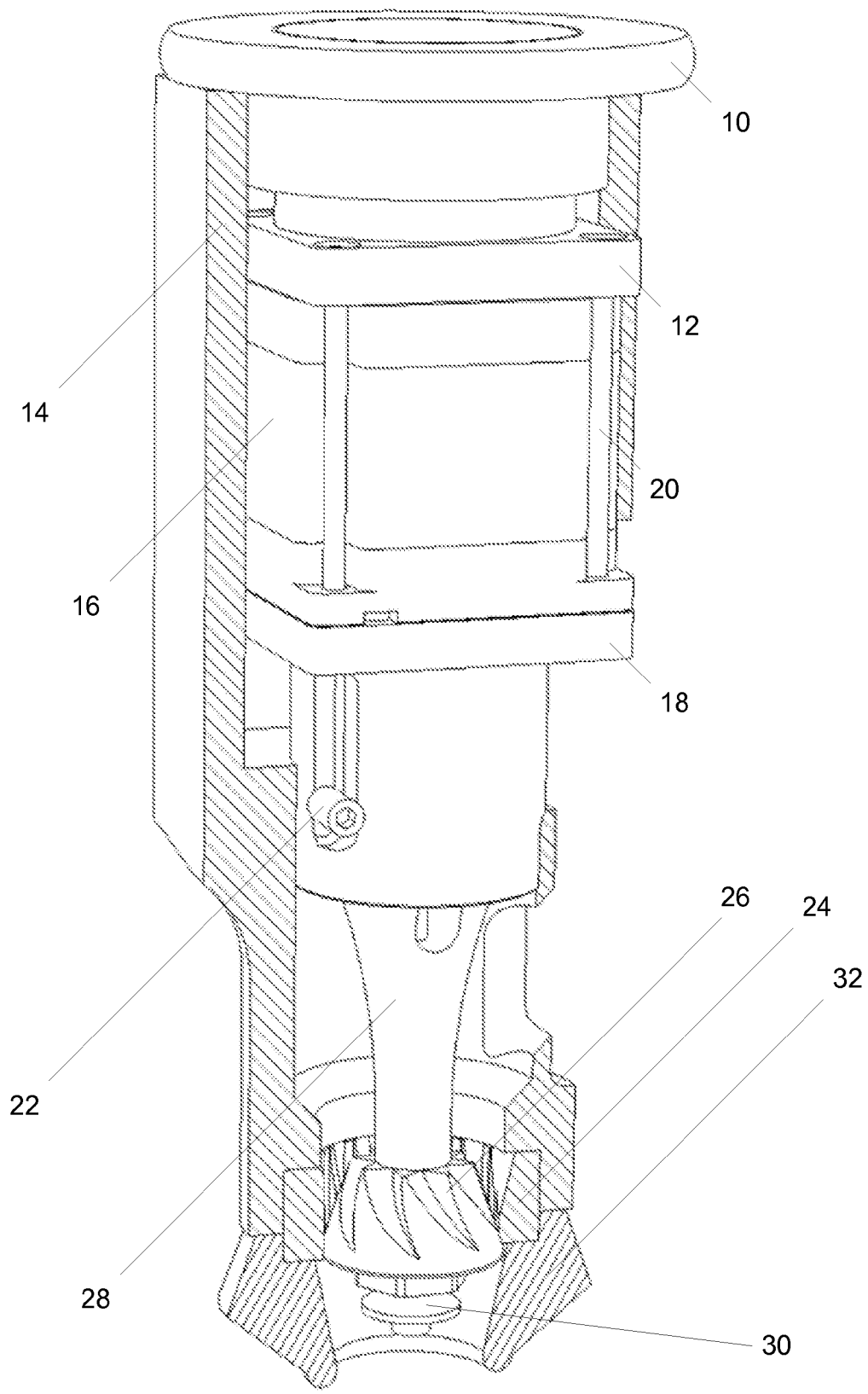
FIG. 1 illustrates an espresso grinder in an operating configuration.

FIG. 1 illustrates an espresso grinder according to one embodiment of the present invention in an operating configuration. Adjuster ring 10 is threaded onto motor cap 12 and resting on top of housing 14. Stepper or servo motor 16 is joined with motor cap 12 and motor base 18 using bolts 20.

Motor base 18 with a concentric sliding fit is coupled to the bore containing the burr set. Motor base 18 has an axial aligned feature and engages torque reaction screw 22. An opposite screw (not shown) is hidden by housing 14.

Outer, fixed burr 24 is seated into hosing 14 and inner, rotating burr 26 is driven by shaft 28 from motor 16. Inner burr 26 is attached with nut and hardware 30 and output nozzle 32 is magnetically retained. A control apparatus (not shown) is used to control motor 16 in increments of rotation such that a precise quantity of ground coffee is delivered through output nozzle 32.

Figure 2:
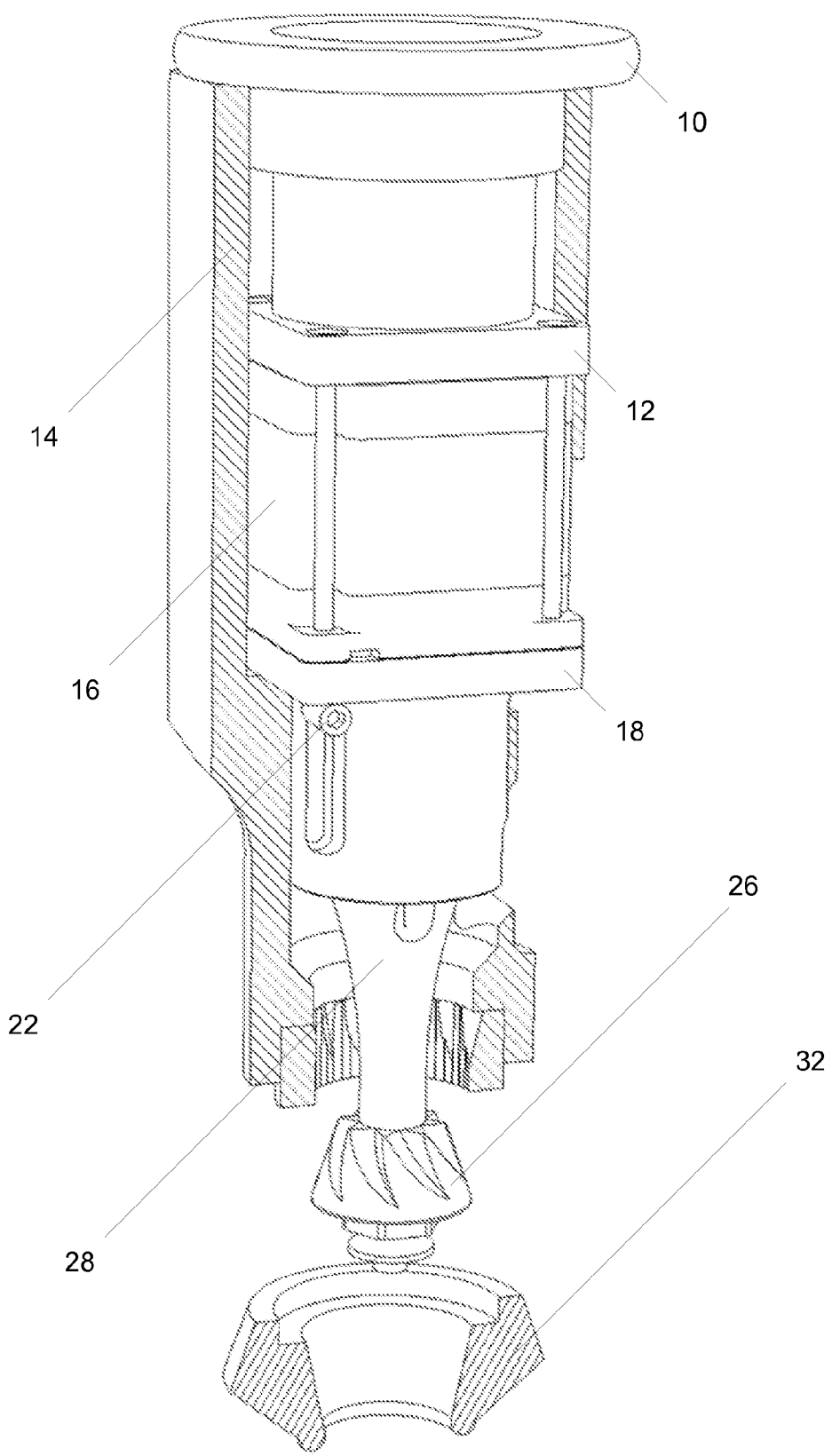
FIG. 2 illustrates an espresso grinder in an empty of beans or removal of drive shaft configuration.

FIG. 2 illustrates an espresso grinder according to one embodiment of the present invention in an empty of beans or removal of drive shaft configuration. Adjuster ring 10 is disconnected from motor cap 12 and resting on top of housing 14. Motor 16, drive shaft 28, and inner burr 26 are at the lower extent of their travel. Torque reaction screw 22 is at the upper limit of the spline in motor base 18. Inner burr 26 is displaced from the grinding position to allow the hopper and grinder to be fully emptied of beans. Output nozzle 32, which is magnetically retained when grinding, is removed for access.

From this position drive shaft 28 may be disconnected and removed by removing a retaining bolt and accessing a tapered shaft disengagement slot through a side opening where the supply of beans enters above the burrs.

Figure 3:
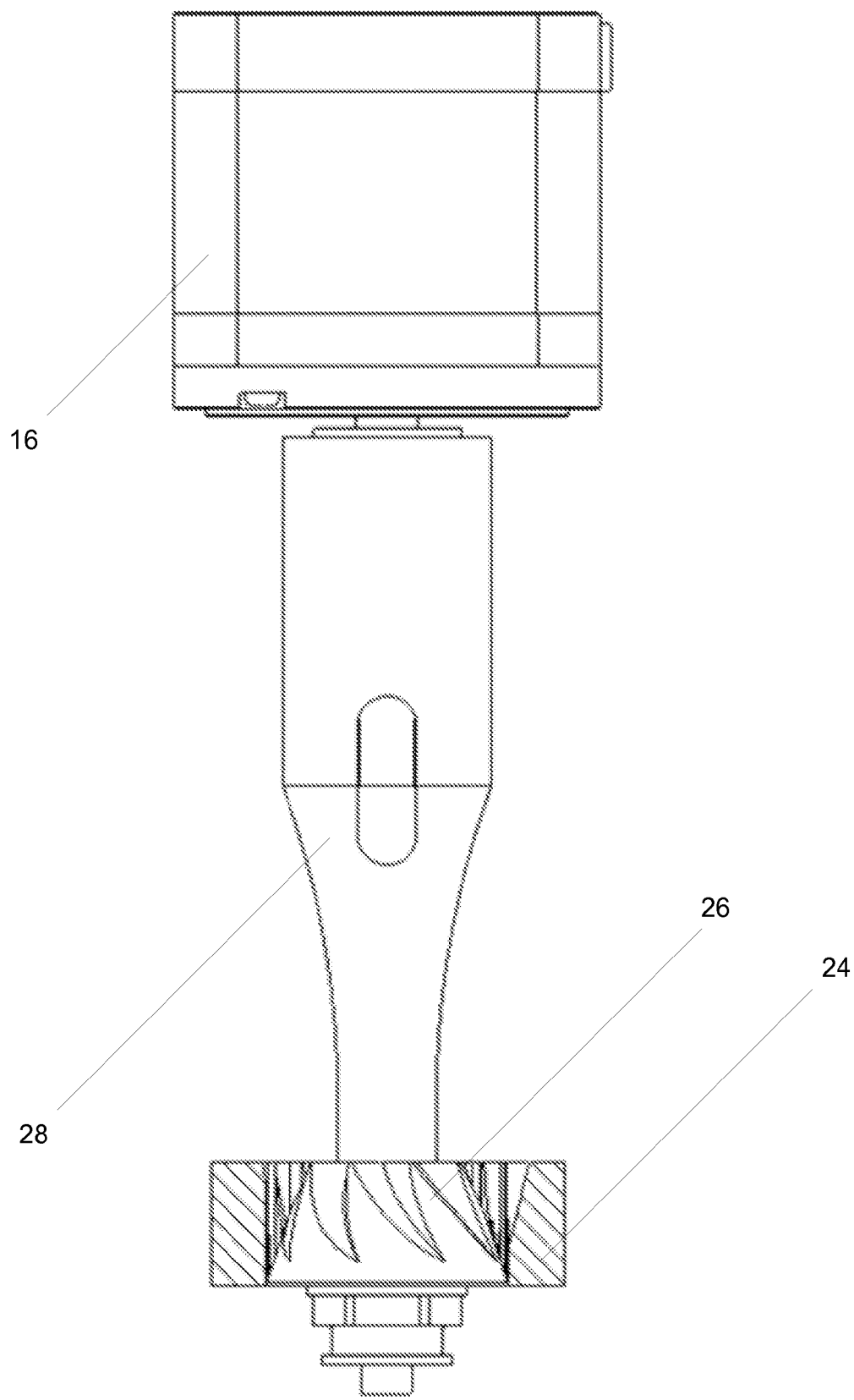
FIG. 3 illustrates espresso grinder components in grinding alignment.

FIG. 3 illustrates motor 16, drive shaft 28, inner burr 26 and outer burr 24 in grinding alignment.

Figure 4:
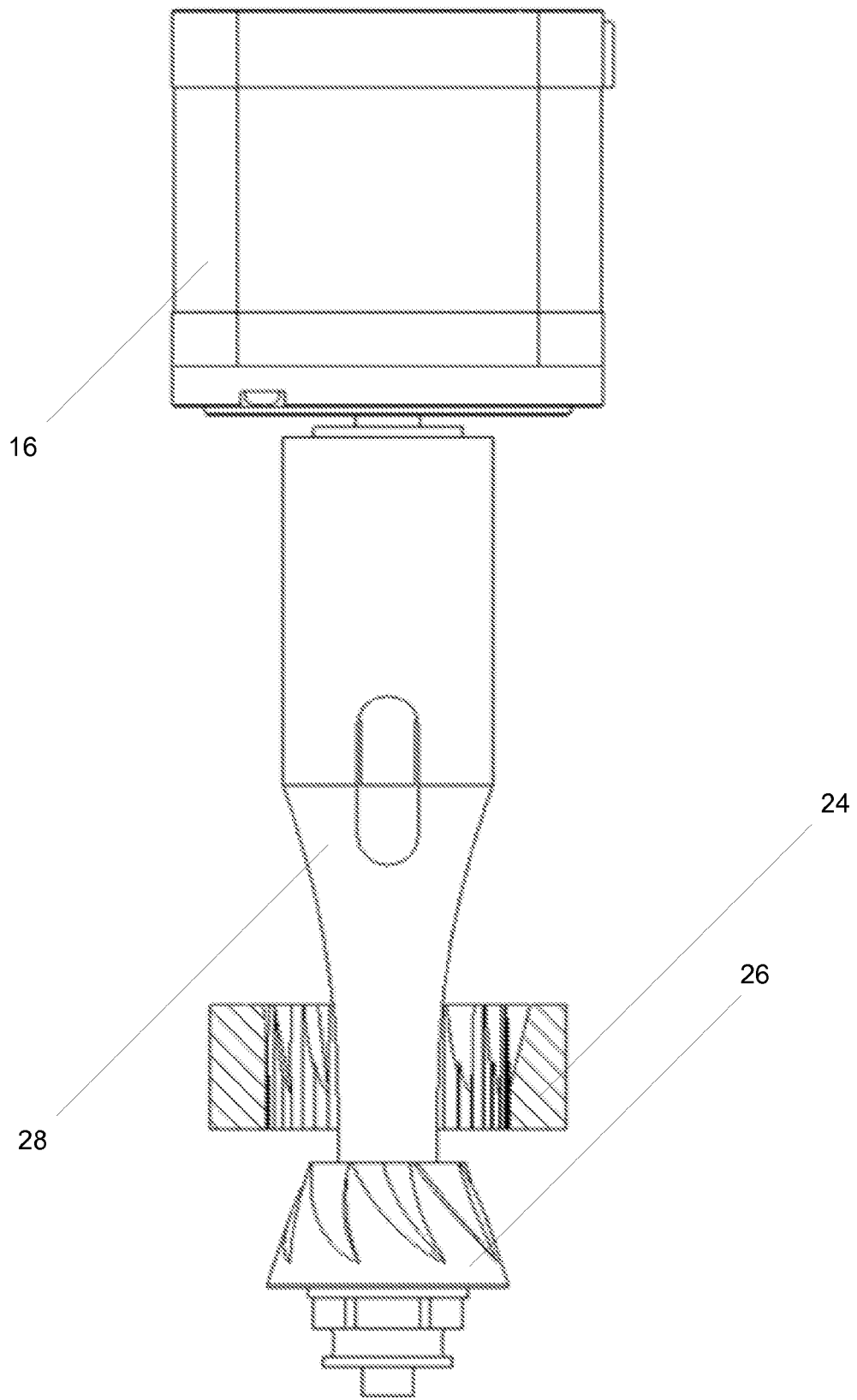
FIG. 4 illustrates espresso grinder components displaced from the grinding alignment.

FIG. 4 illustrates motor 16, drive shaft 28 and inner burr 26 displaced from the grinding alignment to empty the grinder or remove drive shaft 28.

Figure 5:
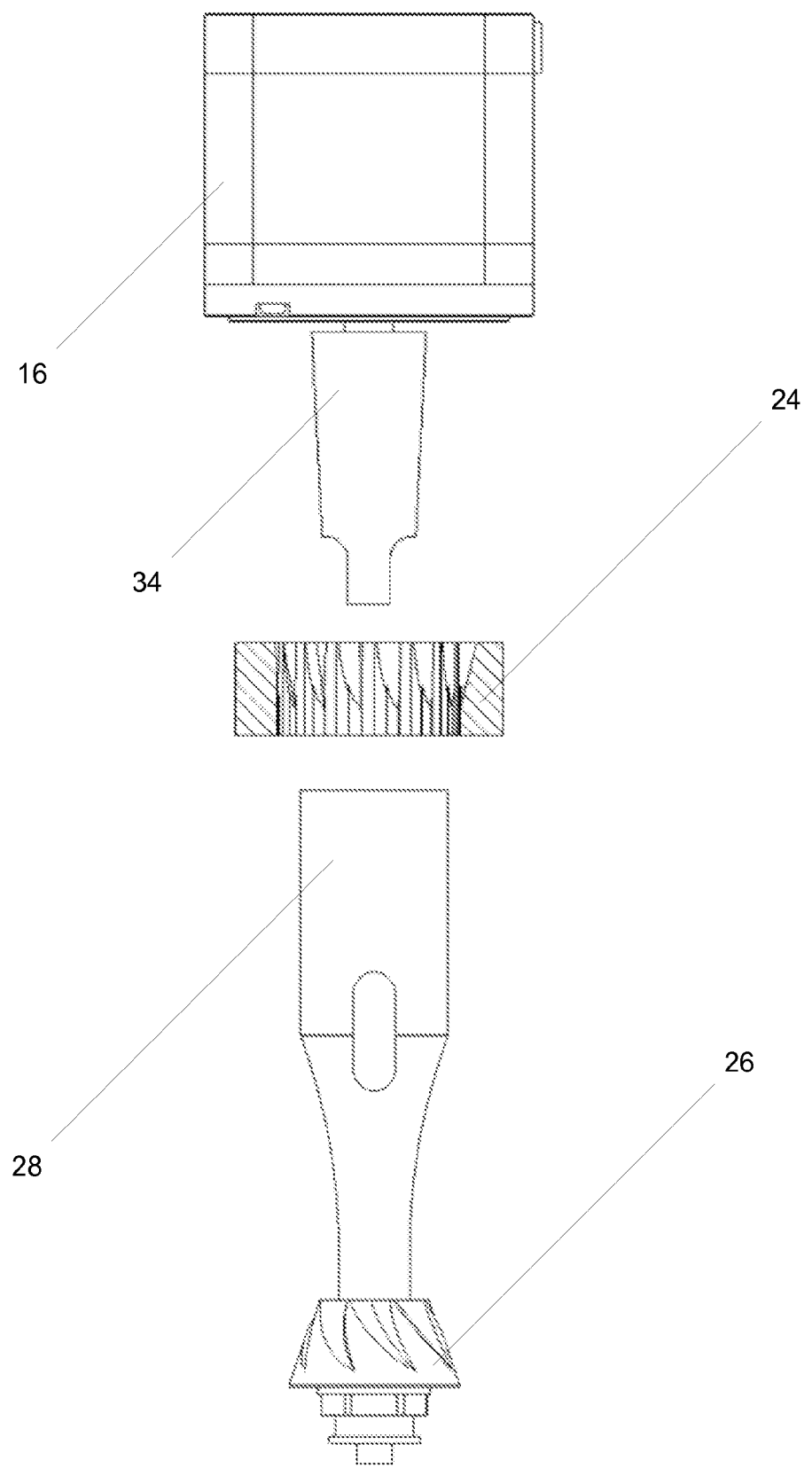
FIG. 5 illustrates espresso grinder components removed for cleaning or service.

FIG. 5 illustrates motor 16 with male tapered connector 34, which is used to drive female tapered drive shaft 28 and inner burr 24. Drive shaft 28 and inner burr 26 are removed for cleaning or service.

Embodiments of the present invention utilize a reorganization of an espresso grinder design that facilitates reliable delivery of ground coffee out of the grinder and increases the functionality of the reorganized grinder to facilitate commercial scale use.

Irregular delivery of ground coffee out of the grinder is largely a result of the common practice of positioning the driving motor below the burr set. This is inexpensive and allows the fixed burr to be mounted in a carrier that is threaded to allow grind adjustment. The placement of the burr above the motor adds significant length and complication to the ground coffee exit path and increases opportunities for quantities to be retained or dislodged.

Ground coffee can have may qualities that make it difficult to route. In the typical grinder it must be routed laterally to clear the motor below the burr and be accessible for collection and use. Ground coffee can have electrostatic charges, can be susceptible to electrostatic charges, may carry heat from grinding, may have diverse particle size, and may have dry, dusty, oily, and moist fractions.

Due to these challenges, eliminating the requirement for lateral routing of ground coffee can have great advantages. Organizing the grinder in the image of a typical pepper mill where the driving force is applied from above and the ground product falls immediately from the burr set accomplishes this end. In doing so, un-ground beans may be more easily delivered laterally to a volume annular to a driving shaft and above the burr set.

Coffee grinders using this strategy are limited to non-commercial production due to problems including challenges cleaning, emptying of coffee, changing of coffee, means of adjusting the grind, and means of setting the grinder output. Using the motor above burr set format, ground coffee is produced immediately above its point of collection and or use. The parts of the grinder requiring cleaning of grounds are reduced to a minimum.

The present invention is for a coffee grinder which implements various features and strategies that can improve use and function and allow for very accurate generation of ground coffee, reducing waste. Features of embodiments of the present invention include the following:

Ground coffee departs from the burrs directly into the removable output nozzle.

The output nozzle is mounted and demounted using no tools and is magnetically retained.

Grind adjustment is separate from the mounting of the fixed burr and operates by moving the motor/driven burr assembly relative to the fixed burr.

The grind adjustment feature can be disconnected from the motor/shaft/inner burr assembly. This allows the disconnected components to move to be displaced downward vertically, within the housing, to an extent outside of the normal range of grind adjustment.

The grind adjustment feature disconnection allows the driven (inner) burr to vacate the interior of the fixed burr to allow the hopper and grinder to empty of all un-ground beans through the lowest point. The grind adjustment feature disconnection also allows easy access to service and removal of the machine taper drive shaft which carries the driven burr.

The grind adjustment feature disconnection allows the grind adjustment to be retained while beans are emptied or the shaft is removed.

The torque between the motor, the driven burr, and the fixed burr is resolved independently of the grind adjustment by torque reaction bolts action on a spline or feature of the motor carrier.

The driven burr is mounted to a shaft with a machine taper.

The motor has machine taper to connect to the driven burr shaft.

Un-ground beans can be emptied entirely from the hopper and machine by disconnecting the adjuster to fully open the burr set.

The motor is of stepper, servo, or other type which is controllable in terms of degrees or increments of burr rotation by open or closed loop means. A correlation between weight or volume of ground coffee output to degrees or increments of burr rotation allows the grinder to be set to a target output using a calculation.

The present invention has been described above in connection with several preferred embodiments. This has been done for purposes of illustration only, and variations of the inventions will be readily apparent to those skilled in the art and also fall within the scope of the invention.

The invention claimed is:

1. A method of grinding coffee comprising the steps of:
   providing a motor capable of being controlled in increments of rotation;
   providing a drive shaft attached to said motor;
   providing an inner burr attached to said drive shaft;
   providing a housing;
   providing an outer burr attachable to said housing;
   providing an output nozzle attachable to said housing;
   operating said motor for a period of time;
   determining an amount of burr rotation during said step of operating;
   measuring a quantity of coffee produced during said step of operating;
   calculating an amount of burr rotation necessary to produce a predetermined quantity of ground coffee;
   controlling said motor, using a result from said step of calculating, to operate for an amount of burr rotation such that a predetermined amount of ground coffee is produced.

2. The method of claim 1 wherein said output nozzle is magnetically retained to said housing.

3. The method of claim 1 wherein said motor and said drive shaft are positioned vertically above said inner burr and said outer burr such that during grinding said ground coffee will fall vertically from said output nozzle.

4. The method of claim 3 further comprising the step of:
adjusting a grind adjustment feature to control the coarseness of said ground coffee.

5. The method of claim 4 wherein said grind adjustment feature operates by moving said inner burr relative to said outer burr.

6. The method of claim 5 wherein said motor is a stepper motor.

7. The method of claim 5 wherein said motor is a servo motor.

8. The method of claim 3 wherein said motor is a stepper motor.

9. The method of claim 3 wherein said motor is a servo motor.

10. The method of claim 1 further comprising the step of:
adjusting a grind adjustment feature to control the coarseness of said ground coffee.

11. The method of claim 10 wherein said grind adjustment feature operates by moving said inner burr relative to said outer burr.

12. The method of claim 1 wherein said drive shaft can be disconnected from said motor to allow easy access for service.

13. The method of claim 1 wherein said motor is a stepper motor.

14. The method of claim 1 wherein said motor is a servo motor.

* * * * *